J. R. Brown,
Wrench.
N° 26,544.   Patented Dec. 20, 1859.

Witnesses:

Inventor:
James R. Brown

UNITED STATES PATENT OFFICE.

JAMES R. BROWN, OF BOSTON, MASSACHUSETTS, ASSIGNOR TO HIMSELF, AND J. HENRY NORTON, OF MEDFORD, MASSACHUSETTS.

PIPE-CUTTER.

Specification of Letters Patent No. 26,544, dated December 20, 1859.

*To all whom it may concern:*

Be it known that I, JAMES R. BROWN, of Boston, in the county of Suffolk and State of Massachusetts, have invented an Improved Pipe-Cutter or Instrument for Severing Metallic or Gas Pipes; and I do hereby declare that the same is fully described and represented in the following specification and the accompanying drawings, of which—

Figure 1:
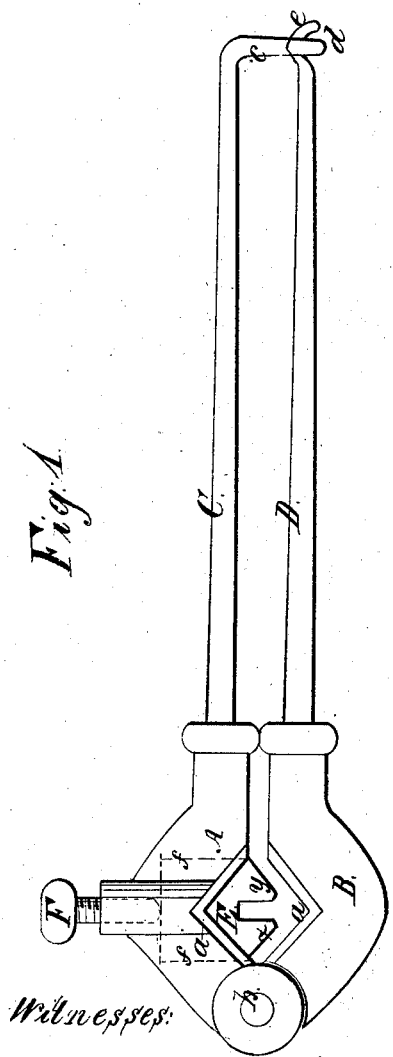
Figure 2:
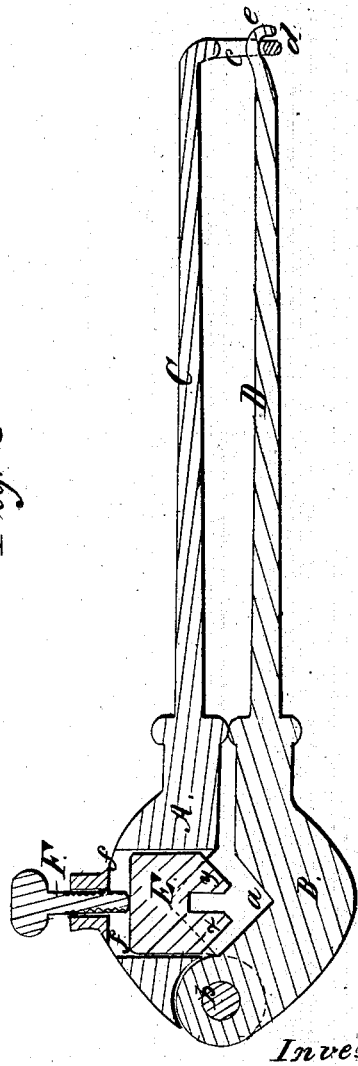

Figure 1, is a side view, and Fig. 2, a longitudinal section of such pipe cutter.

In constructing such instrument I employ two jaws or pipe holders A, B, having the forms as exhibited in the drawings. Each jaw is provided with an angular recess $a$, and both are hinged together or turn on a common joint pin $b$. From each jaw a shank or handle C, or D, is extended either or both of which should be tapering and of a material that will permit the same to spring. One of the shanks, viz. C, is formed with a right angular bend $c$, and terminates in a hook $d$. The other shank is bent as shown at $e$, the same being to enable the hook $d$, to clasp and hold the shank D. Furthermore, transversely within the jaw A, there is a recess or socket $f$, for the reception of a furcated cutter E, so fitted and formed as to be capable of being moved endwise within the jaw and either toward or away from the recess $a$, and of the other jaw B. The upper end of the cutter rests against the inner end of an adjusting screw F, which screws transversely into the jaw A, as shown in Fig. 2.

Preparatory to using the above described instrument for cutting a pipe the screw F, should be turned back sufficiently not only to enable the pipe to be introduced into the recess $a$, of the jaw B, and the jaws to be closed far enough to grasp the pipe by the cutter and the jaw B, but so that under such circumstances one or both spring shanks may be sprung inward and so as to hook the two shanks together and cause the cutter by the power of the spring of the shank or shanks to be forced hard against the pipe. Under this state of things if the implement turned on the pipe the cutting edges $x$, $y$, of the cutter will make a groove in the pipe and transversely around it, the spring of the shank or shanks, operating to feed the cutter farther into the pipe during each turn of the instrument about the pipe. This feeding of the cutter as it may slacken may be increased by turning the screw F, so as to force the cutter harder against the pipe. The spring and connection device or hook of the shank thus operate to save the workman from the labor of forcing the shanks toward one another by the grasp of his hand while he turns the instrument on the pipe. The cutter edges should be so arranged, and formed that each may cut into the pipe while being moved around it. The pipe cutting instrument so made is self feeding and operates to excellent advantage.

I am aware that blacksmiths' pincers are often made with spring shanks. Therefore I do not claim such under such an application of them, but What I do claim as a new or improved article of manufacture, is—

The pipe cutting instrument, as constructed with the hinged and recessed jaws, the movable cutter, the adjustable screw, and the spring shank or shanks extending from the jaws and having a connection hook or its equivalent all substantially as specified.

JAMES R. BROWN.

Witnesses:
J. M. NORTON,
F. P. HALE, Jr.